March 17, 1953 — W. E. DUERINGER — 2,631,917
RECORDING APPARATUS
Original Filed May 8, 1947
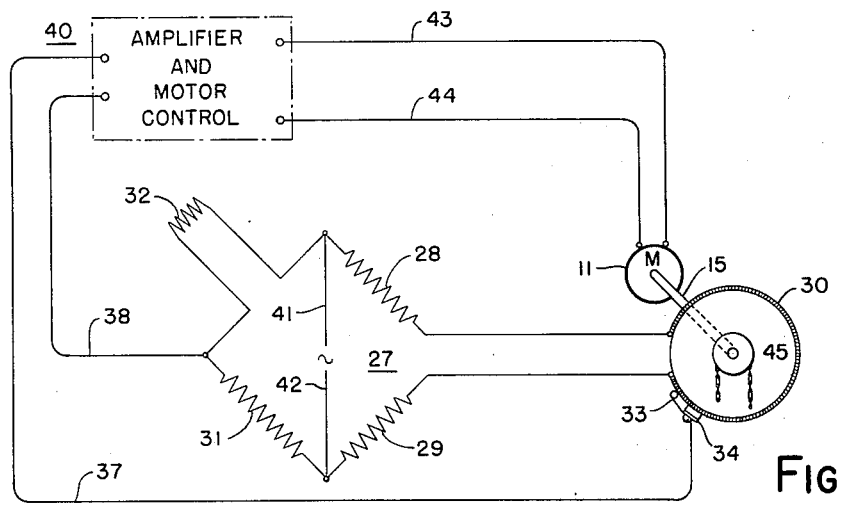
FIG. 1
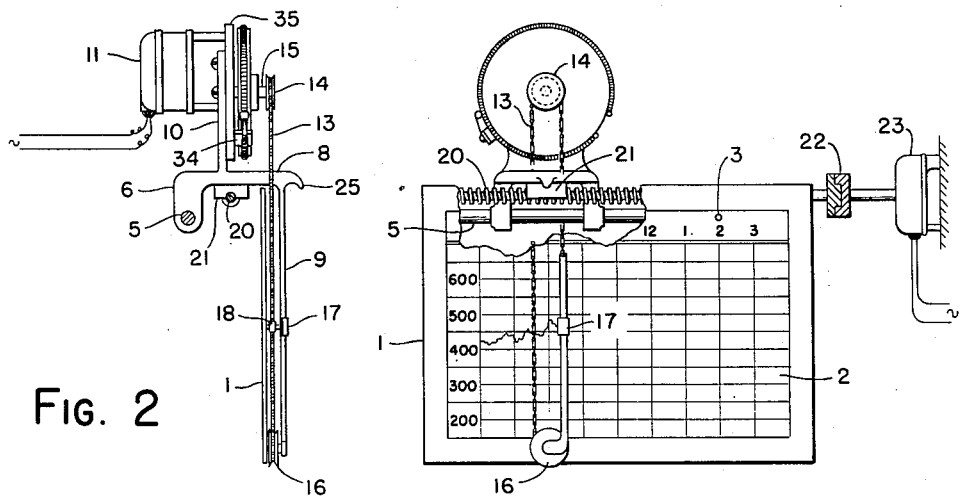
FIG. 2
FIG. 3
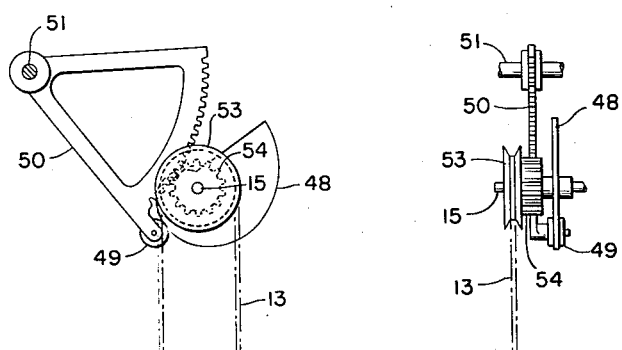
FIG. 4
FIG. 5
INVENTOR.
WALTER E. DUERINGER
BY Raymond A. Junkins
ATTORNEY Patented Mar. 17, 1953

2,631,917

UNITED STATES PATENT OFFICE 2,631,917

RECORDING APPARATUS

Walter E. Dueringer, Shaker Heights, Ohio, assignor to Bailey Meter Company, a corporation of Delaware Original application May 8, 1947, Serial No. 746,660. Divided and this application May 19, 1948, Serial No. 28,002

7 Claims. (Cl. 346—32)

This invention relates to apparatus for measuring and recording the values of a variable condition, and more particularly to apparatus for moving a marking device over a stationary chart so as to record thereon the values of a variable condition.

A preferred form of my invention may include a framework supported for movement in a given path relative to the chart and, in turn, supporting a marking device for movement across the chart in a direction normal to the direction in which the framework moves. Means are desirably provided for moving the framework at a constant speed, and mounted on the framework is a mechanism operating in one direction or the other in response to changes in a variable condition and connected to the marking device for moving it across the chart. If desired, the framework could be moved in one direction or the other in a given path in response to changes in a condition, while the marking device is moved in one direction across the chart at a given speed.

The framework is desirably supported so that it may be easily released from its moving means and be positioned manually for starting a record on a new chart. On releasing the framework from its moving means, the marking device is moved out of engagement with the chart, and the chart is left unobstructed so that it may be replaced by a new chart.

An object of my invention is to provide an improved apparatus for measuring and recording a variable condition. Another object is to provide an apparatus for recording variations of a condition on a stationary chart. Still another object is to provide an improved apparatus for moving a marking device over a chart in one direction at a constant speed and in directions normal thereto in accordance with variations in a condition. Yet another object is to provide an apparatus for recording on a stationary rectangular chart the variations of a condition, and being arranged for movement manually to a position permitting removal of the chart on which the record is made and to a position for starting a record on a new chart. Other objects will appear in the course of the following description.

This case is a division of my copending application, Serial No. 746,660 filed May 8, 1947.

In the accompanying drawing there are shown for purposes of illustration, two forms which my invention may assume in practice.

In this drawing:

Fig. 1 is a schematic diagram of a measuring system having my improved apparatus associated therewith.

Fig. 2 is a side elevational view of my improved recording apparatus.

Fig. 3 is a front elevational view, with a portion broken away to facilitate illustration, of my apparatus operating to record variations of a condition on a fixed chart.

Figs. 4 and 5 show another form of driving means for the marking device of Fig. 3.

Referring to the drawing, and more particularly to Figs. 2 and 3, it will be noted that there is shown a chart backing plate 1 adapted to be supported in a fixed position by any suitable means, not shown. A chart or pad of charts 2 is provided with openings 3 at its upper edge for receiving pins projecting from the face of the plate to hold it in place. The openings 3 are desirably spaced so as to receive rings or other securing elements of a record book in which the charts may be kept after they have been marked upon. Other means may be provided for holding the charts in place on the backing plate if desired. Extending parallel to the backing plate at its rear side is a rod 5 on which a framework 6 is slideably supported. The ends of the rod may be carried by members, not shown, attached to the plate 1, or they may be carried by any other supporting means which is held against movement relative to the plate. The framework 6 includes a portion 8 extending over the top of the backing plate, a portion 9 extending downwardly from the end of the portion 8 across the face of the plate, and a portion 10 projecting upwardly from the portion 8 for supporting a motor 11. A cord or a chain 13 extends around a pulley 14 fixed to the power shaft 15 of the motor 11, and also extends around a pulley 16 rotatably supported by the lower end of the framework portion 9. The ends of the cord are attached to a member 17 slideably supported by the framework portion 9 and carrying a pen or marking device 18 which engages the chart when the framework is in the position shown.

For moving the framework along the rod 5 at a constant speed, there is provided a feed screw 20 extending between the rod 5 and the backing plate in a position to be engaged by a half nut 21 carried by the framework when the latter is in a position holding the marking pen in engagement with the chart. The feed screw may be supported by suitable bearings, not shown, at the rear of the backing plate, and is connected by a coupling 22 to a constant speed motor 23.

The chart 2 is shown with markings along its upper edge indicating the time of day, and the motor 23 operates to drive the feed screw at a speed which effects movement of the framework along the rod 5 in accordance with the intervals of time indicated. It will be appreciated that suitable gear reducing mechanisms may be provided if necessary to give the desired speed. As shown, the feed screw is rotated to move the framework along the rod from left to right. Formed on the framework, as shown in Fig. 2, is a projecting portion 25 which may be grasped by the operator for swinging the framework about the rod 5 to remove the half nut from engagement with the feed screw. The framework may then be moved manually along the rod 5 to position the marking pen as desired. It will be seen that a swinging of the framework to disengage the half nut from the feed screw results in a movement of the pen away from the chart so that it is left unobstructed for removal or replacement by a new chart. When the framework is in a position with the nut engaging the feed screw, the weight of the motor and the framework holds it in this position, and the marking device 13 is held in engagement with the chart. If necessary, the supporting means for the pulley 16 may be provided with a projecting portion in engagement with the backing plate to prevent contact between the plate and the pulley.

As shown in Fig. 1, the motor 11 is energized to operate in one direction or the other in response to unbalances in a bridge circuit 27 caused by variations in a condition. The bridge circuit includes fixed resistances 28 and 29 combined with portions of a slidewire resistance 30 to form two bridge legs, a fixed resistance 31 forming a third leg of the bridge, and a resistance 32 varying in value with changes in a condition, such as temperature, and forming the fourth leg. A slidewire contact 33 is supported in a fixed position by a member 34 projecting as shown in Fig. 2, from a plate 35 attached to the motor casing, and this contact determines the portions of the slidewire resistance connected with the resistances 28 and 29 to form the first two legs of the bridge. The contact 33 and a diagonally opposite point on the bridge are connected by conductors 37 and 38 to an amplifier and motor control device 40, which may be like that shown in the Ryder Patent 2,275,317. The other diagonal of the bridge is connected by conductors 41 and 42 to a source of alternating current. Conductors 43 and 44 connect the amplifier to the motor for energizing the latter to rotate in one direction or the other depending upon the direction of bridge unbalance. The slidewire 30 is mounted upon the periphery of a circular plate 45 which is fixed to the power shaft of the motor, and the direction of rotation is such as to position the slidewire under the contact so as to rebalance the bridge.

The operation of the mechanism described is as follows: The framework 6 is first moved to the left-hand end of the rod 5 and is then lowered until it is supported by the half nut 21 engaging the feed screw 20. The motor 23 is operated so that the feed screw causes the framework to be moved to the right along the rod 5 at the rate indicated by the time intervals on the chart. As the temperature or other condition varies and changes the value of the resistance 32 to unbalance the bridge, the motor 11 is energized so that it rotates and positions the slidewire 30 in a direction to rebalance the bridge. The pulley 14 is rotated at the same time and causes the cord 13 to move the member 17 along the framework 49 so that the pen marks upon the chart the change in the condition measured. When the pen has reached the right-hand end of the chart, the operator grasps the portion 25 of the framework and swings it about the rod 5 to disengage the driving connection and to move the pen away from the chart. The chart marked upon is then removed and a new chart is arranged upon the backing plate.

Figs. 4 and 5 show another form of driving mechanism for positioning the pen on the chart with changes in the condition. In this case a cam 48 is fixed to the power shaft 15 of the motor and engages a roller 49 carried by a sector 50 which is pivotally supported by a shaft 51. The shaft 51 may be connected by suitable means to the framework 6, the motor casing, or the plate 35 so that it supports the sector for pivotal movement in a plane normal to the power shaft of the motor. A pulley 53 and a pinion gear 54 are attached to each other and are loosely mounted on the motor shaft in a position to mesh the teeth on the gear with teeth on the sector. The cord 13 is passed around the pulleys 53 and 16 for positioning the member 17 on the framework portion 9.

It will be seen that an operation of the motor causes the cam to turn and to swing the sector 50 about the shaft 51. A swinging of the sector results in a rotation of the pinion gear 54 and the pulley 53 to move the marking pen over the chart. With this arrangement, various characteristics of the system may be modified by the shaping of the cam. At times it may be desirable to record on the chart the rate of fluid flow, and it is preferable that the vertical spacings for equal changes in flow be uniform, as shown in Fig. 3. The bridge may be unbalanced, however, by some condition representative of flow but varying with the square root of flow. In this case, the cam 48 may be shaped to extract the square root relationship and position the pen in direct proportion to changes in flow.

While there are described in this application two forms which my invention may assume in practice, it will be understood that it may be modified and embodied in various other forms without departing from its spirit or the scope of the appended claims.

What I claim as new and desire to secure by Letters Patent of the United States, is:

1. Apparatus for recording a variable condition including, in combination, a stationary chart backing plate, a shaft supported in a position parallel to said plate, a framework pivoted from said shaft, said framework having a portion offset from the axis of said shaft and lying in a plane perpendicular to the latter, a feed screw arranged between said shaft and plate and extending parallel thereto, means for rotating said feed screw at a constant speed, a half nut fixed to said framework and engaging said feed screw, a marking device supported by the offset portion of said framework and marking on a chart supported on the face of said plate when said half nut engages said feed screw, and a motor supported by said framework and connected to the marking device for operating it in one direction or the other in response to changes in a condition to be recorded.

2. The apparatus of claim 1 in which said shaft is supported at the rear side of said backing plate, said offset framework portion extends over the top of said plate and downwardly across the face of the plate when in a recording position, and said feed screw is arranged beneath said framework portion for engagement by said half nut.

3. The apparatus of claim 1 in which the connection between the motor and marking device includes a pulley fixed to the power shaft of said motor, a pulley supported by said offset framework portion, and drive means connecting said pulleys and said marking device.

4. The apparatus of claim 1 in which the connection between the motor and marking device includes a cam fixed to the power shaft of said motor, a sector pivotally supported in a position to be actuated by said cam, a pinion gear loosely supported by said motor shaft and meshing with teeth on said sector, a pulley fixed for rotation with said pinion gear, a pulley supported by said offset framework portion, and drive means connecting said pulleys and said marking device.

5. Apparatus for recording a variable condition including, in combination, a stationary chart backing plate, a shaft supported in a position parallel to said plate, a framework pivoted from and slideable upon said shaft, said framework having a portion offset from the axis of said shaft and lying in a plane perpendicular to the latter, a feed screw arranged between said shaft and plate and extending parallel thereto, a first motor for rotating said feed screw, a half nut on the framework and feed screw, a marking device supported by the offset portion of said framework and marking on a chart supported on the face of said plate when said half nut is connecting the feed screw and framework, a second motor supported by said framework, means connecting the second motor to said marking device for moving it along said framework, means operating the first motor at a constant speed, and means for energizing the second motor to cause it to operate in one direction or the other in response to changes in a condition to be measured.

6. A mechanism for supporting and actuating a marking pen over a chart of a recording meter including, means supporting a shaft in a horizontal position, a framework pivoted from and slideable upon the shaft, said framework having a portion offset from the axis of the shaft and lying in a plane perpendicular to the latter, a feed screw having its axis extending parallel to the axis of the shaft, means for rotationg the feed screw, a half nut joining the framework and the feed screw, a marking pen on the offset portion of the framework and marking on the meter chart when the half nut and feed screw are cooperated, and a motor supported by the framework and operating the marking pen in accordance with changes in a condition to be measured.

7. The mechanism of claim 6 including, a cam actuated by the motor, a sector pivotally supported in a position to be actuated by the cam, a pinion gear meshing with teeth on the sector for actuation by the latter, and connecting means between the pinion gear and the marking pen.

WALTER E. DUERINGER.

REFERENCES CITED

The following references are of record in the file of this patent:

UNITED STATES PATENTS

| Number | Name | Date |
| --- | --- | --- |
| 2,031,050 | Leeds | Feb. 18, 1936 |
| 2,066,539 | Rosene | Jan. 5, 1937 |
| 2,113,748 | Rose et al. | Apr. 12, 1938 |
| 2,312,945 | Williams, Jr. | Mar. 2, 1943 |
| 2,377,474 | Allwein | June 5, 1945 |
| 2,467,808 | Canada | Apr. 19, 1949 |
| 2,569,328 | Omberg | Sept. 25, 1951 |